United States Patent
Sato

(10) Patent No.: US 7,161,698 B2
(45) Date of Patent: Jan. 9, 2007

(54) PRINTING APPARATUS USING NETWORK

(75) Inventor: Toshiyuki Sato, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 943 days.

(21) Appl. No.: 10/073,640

(22) Filed: Feb. 11, 2002

(65) Prior Publication Data

US 2003/0151765 A1  Aug. 14, 2003

(51) Int. Cl.
G06F 3/12 (2006.01)

(52) U.S. Cl. .................. 358/1.15; 358/1.13; 358/1.1; 358/1.16

(58) Field of Classification Search ............. 358/1.1, 358/1.13, 1.15, 1.16
See application file for complete search history.

(56) References Cited

U.S. PATENT DOCUMENTS 5,625,757 A * 4/1997 Kageyama et al. ........ 358/1.14
6,757,070 B1 * 6/2004 Lin et al. ................... 358/1.1

FOREIGN PATENT DOCUMENTS

JP  10-289071 A  10/1998
JP  2000-267832 A  9/2000

* cited by examiner

Primary Examiner—Joseph R. Pokrzywa
Assistant Examiner—Vu B. Hang
(74) Attorney, Agent, or Firm—Frishauf, Holtz, Goodman & Chick, P.C.

(57) ABSTRACT

A printing apparatus using a network which is used in a network environment in which a plurality of computer devices and a plurality of network printing apparatuses are connected to a network spools printing jobs received from the computer devices, displays information of the printing jobs and information of the other network printing apparatuses for a user, and transfers the specified printing job to the specified network printing apparatus when the user specifies the printing job and the network printing apparatus.

9 Claims, 7 Drawing Sheets

PRINTING APPARATUS USING NETWORK

BACKGROUND OF THE INVENTION

1. Field of the Invention

This invention relates to a printing apparatus using a network which performs the printing operation according to a printing job received from a computer device in a network environment in which a plurality of computer devices and a plurality of network printing apparatuses are connected to a network.

2. Description of the Related Art

For example, in an office, a network to which computer devices such as a plurality of PCs (personal computers) and a plurality of network printing apparatuses are connected is configured. In the above network, for example, a user makes a printing request to the network printing device via the PC. In this case, if the network printing apparatus has received a printing request for making a large amount of prints from a different user, the network printing apparatus cannot perform the printing job requested from the former user until the printing operation for a large amount of prints is terminated. Therefore, the printing request made by the former user is kept in the wait state. Further, if a printing request is made to a network printing apparatus in which printing paper or toner/ink has been used up, the network printing apparatus does not perform the requested printing operation until an error is cleared.

In order to avoid the above situation, it is necessary to previously register an instruction in the network printing apparatus to transfer the printing job to another network printing apparatus.

BRIEF SUMMARY OF THE INVENTION

An object of this invention is to provide a printing apparatus using a network which can easily transfer a printing job spooled therein to another network printing apparatus specified by a user.

According to an aspect of the present invention, there is provided a first printing apparatus using a network which is used in a network environment in which a plurality of computer devices and a plurality of network printing apparatuses are connected to a network and comprises a spool section which spools printing jobs received from the computer devices, a display section which displays information of the printing jobs and information of the other network printing apparatuses in response to a preset operation, an operating section which is used to receive specification of the printing job based on the information of the printing jobs and specification of the other network printing apparatus based on the information of the other network printing apparatuses, and a transfer section which transfers the specified printing job to the specified network printing apparatus.

According to another aspect of the present invention, there is provided a second printing apparatus using a network which is used in a network environment in which a plurality of computer devices and a plurality of network printing apparatuses are connected to a network and comprises a spool section which spools printing jobs received from the computer devices, a web page section which stores a web page by use of which the spooled printing jobs and information of the other network printing apparatuses are provided to the computer and specification of the printing job and specification of the network printing apparatus are received, and a transfer section which transfers the specified printing job to the specified network printing apparatus.

According to still another aspect of the present invention, in a printing system using a network which is used in a network environment in which a plurality of computer devices and a plurality of network printing apparatuses are connected to a network, each of the computer devices includes an application section which stores an application used to collect information of printing jobs spooled in the network printing apparatus to which the computer device itself transmits the printing job together with information of the other network printing apparatuses, receive specification of the printing job and specification of the network printing apparatus based on the above information and transmit the specifications as information to the network printing apparatus and each of the network printing apparatuses includes a spool section which spools printing jobs received from the computer devices, a collecting section which collects information of the spooled printing jobs and information of the other network printing apparatuses when a preset instruction is received from the application, and a transfer section which transfers the specified printing job to the specified network printing apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and comprise a part of the specification, illustrate presently embodiments of the invention, and together with the general description given above and the detailed description of the embodiments given below, serve to explain the principles of the invention.

DETAILED DESCRIPTION OF THE INVENTION

There will now be described embodiments of this invention with reference to the accompanying drawings.

First Embodiment

Figure 1:
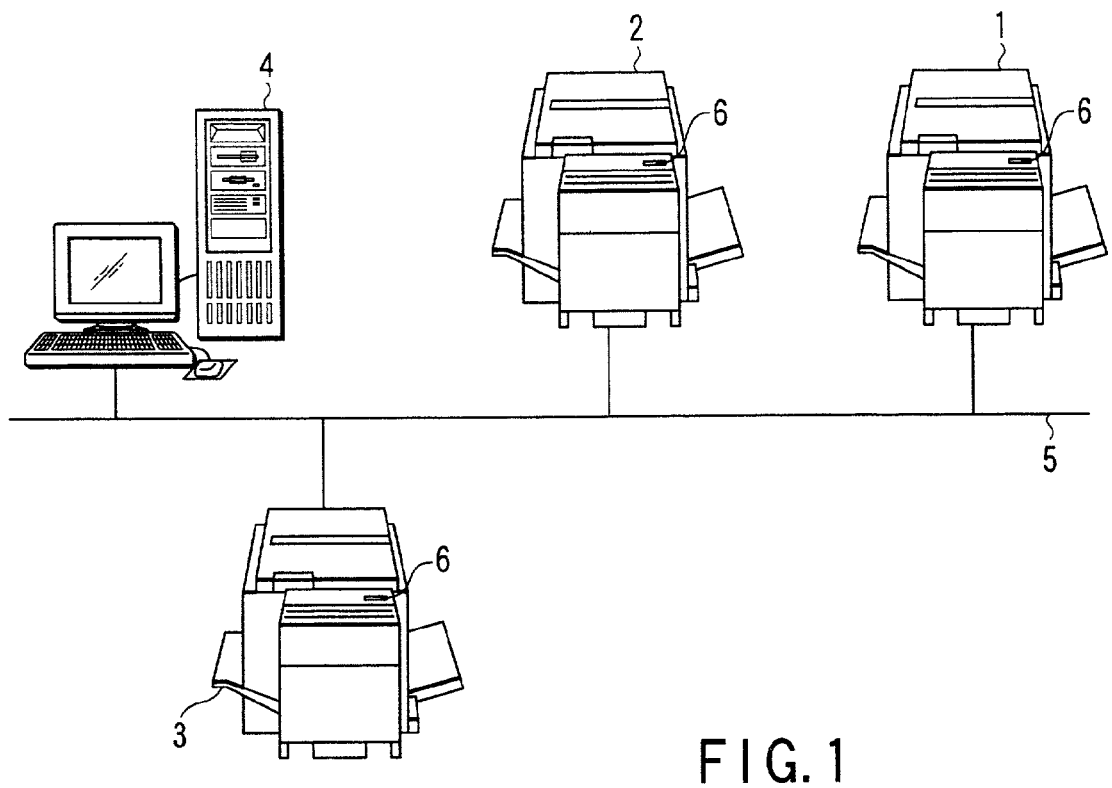
FIG. 1 is a view showing a network to which a PC and a plurality of network printing apparatuses in a first embodiment of this invention are connected.
Figure 3:
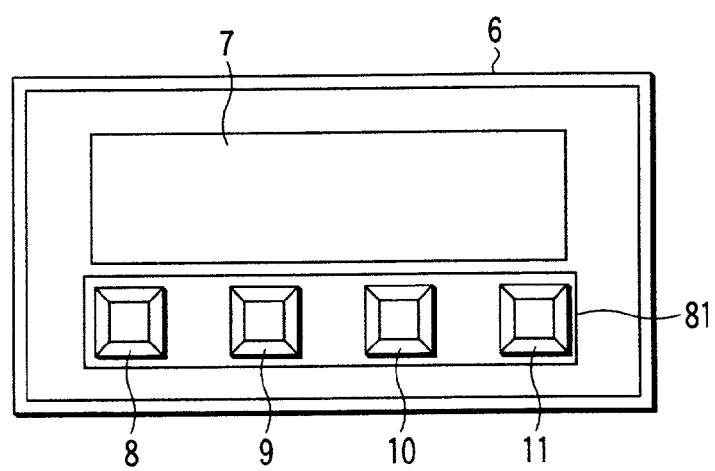
FIG. 3 is a view showing an operating section of the network printing apparatus in the first embodiment.

FIG. 1 shows a network 5 to which a plurality of network printing apparatuses 1, 2, 3 and a PC 4 used as a computer device are connected. Further, FIG. 3 shows an operating panel 6 which is common in each of the network printing apparatuses 1, 2, 3 and includes a liquid crystal panel 7 for display and a button section 81 which has a printing job transfer button 8 used to input transfer of the printing job and a plurality of buttons 9, 10, 11 used to input various information items.

For example, a protocol used for the printing request on the network 5 is an LPR (line printer request), IPP (internet printer protocol), RAW, IPX (internet protocol exchange) or the like. Further, for example, a protocol used for discovery on the network is an SLP (service location protocol), SSDP (simple service discovery protocol) or the like.

Figure 2:
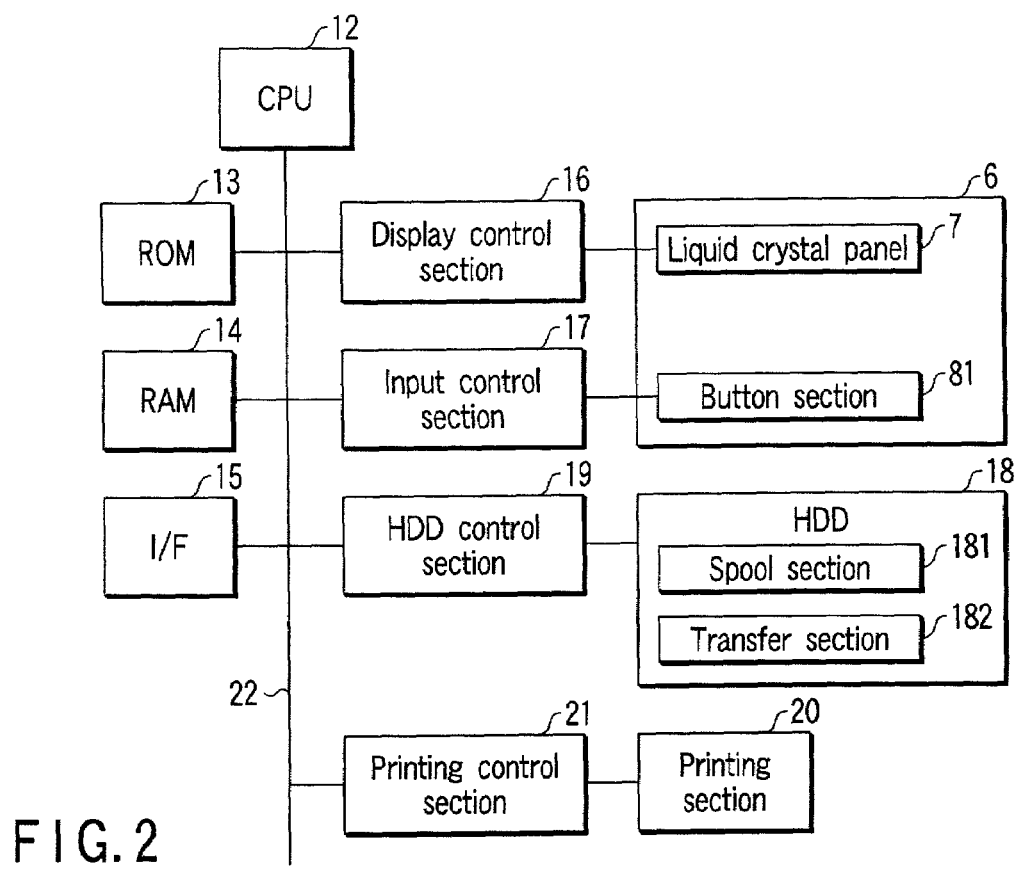
FIG. 2 is a diagram showing a general control block of the network printing apparatus in the first embodiment.

FIG. 2 shows a control block which is common in each of the network printing apparatuses 1, 2, 3. A CPU (central processing unit) 12 controls the operation of each of the network printing apparatuses 1, 2, 3 as a control section main body. In a ROM (read only memory) 13, a program based on which the CPU 12 is operated is stored. In a RAM (random access memory) 14, an area such as a work area used for making calculations when the CPU 12 executes the program is formed. An I/F (interface) 15 is used for connection with the network 5. Display on the liquid crystal panel 7 is controlled by a display control section 16 and inputting from the button section 81 is controlled by an input control section 17. An HDD (hard disk drive) 18 is controlled by an HDD control section 19. A printing section 20 for printing is controlled by a printing control section 21.

The CPU 12 is connected to the ROM 13, RAM 14, I/F 15, display control section 16, input control section 17, HDD control section 19 and printing control section 21 via a bus line 22.

The HDD 18 includes a spool section 181 which spools a printing job received from the PC 4 and a transfer section 182 storing a mode in which a specified printing job is transferred to a specified network printing apparatus. Further, in the HDD 18, a user ID of each PC connected to the network 5 is registered and setting of an administrator or a general user is stored for each user ID.

Figure 4:
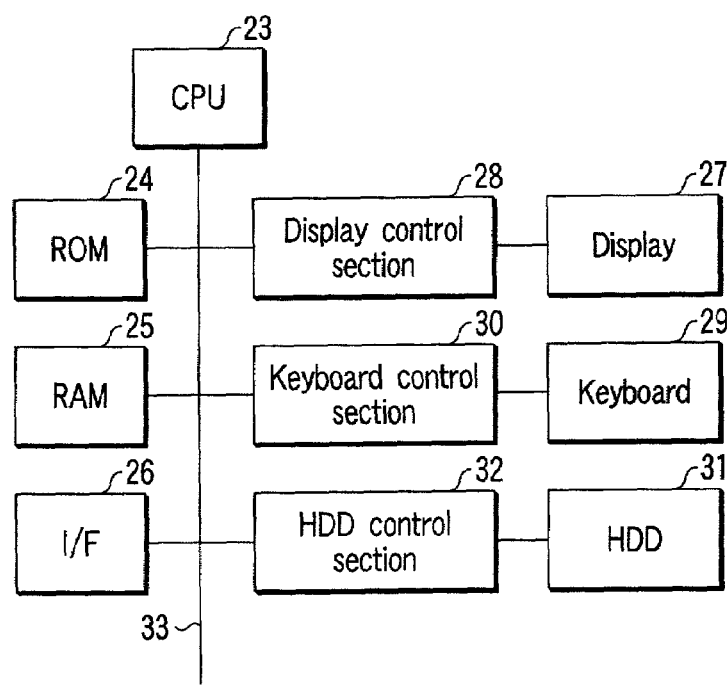
FIG. 4 is a diagram showing a control block of the PC in the first embodiment.

FIG. 4 is a diagram showing a general control block of the PC 4. A CPU 23 controls the operation of the PC 4 as a control section main body. In a ROM 24, a program based on which the CPU 23 is operated is stored. In a RAM 25, an area such as a work area used for making calculations when the CPU 23 executes the program is formed. An I/F (interface) 26 is used for connection with the network 5. A display 27 is controlled by a display control section 28. A keyboard 29 is controlled by a keyboard control section 30. An HDD 31 is controlled by an HDD control section 32.

The CPU 23 is connected to the ROM 24, RAM 25, I/F 26, display control section 28, keyboard control section 30 and HDD control section 32 via a bus line 33.

Figure 5:
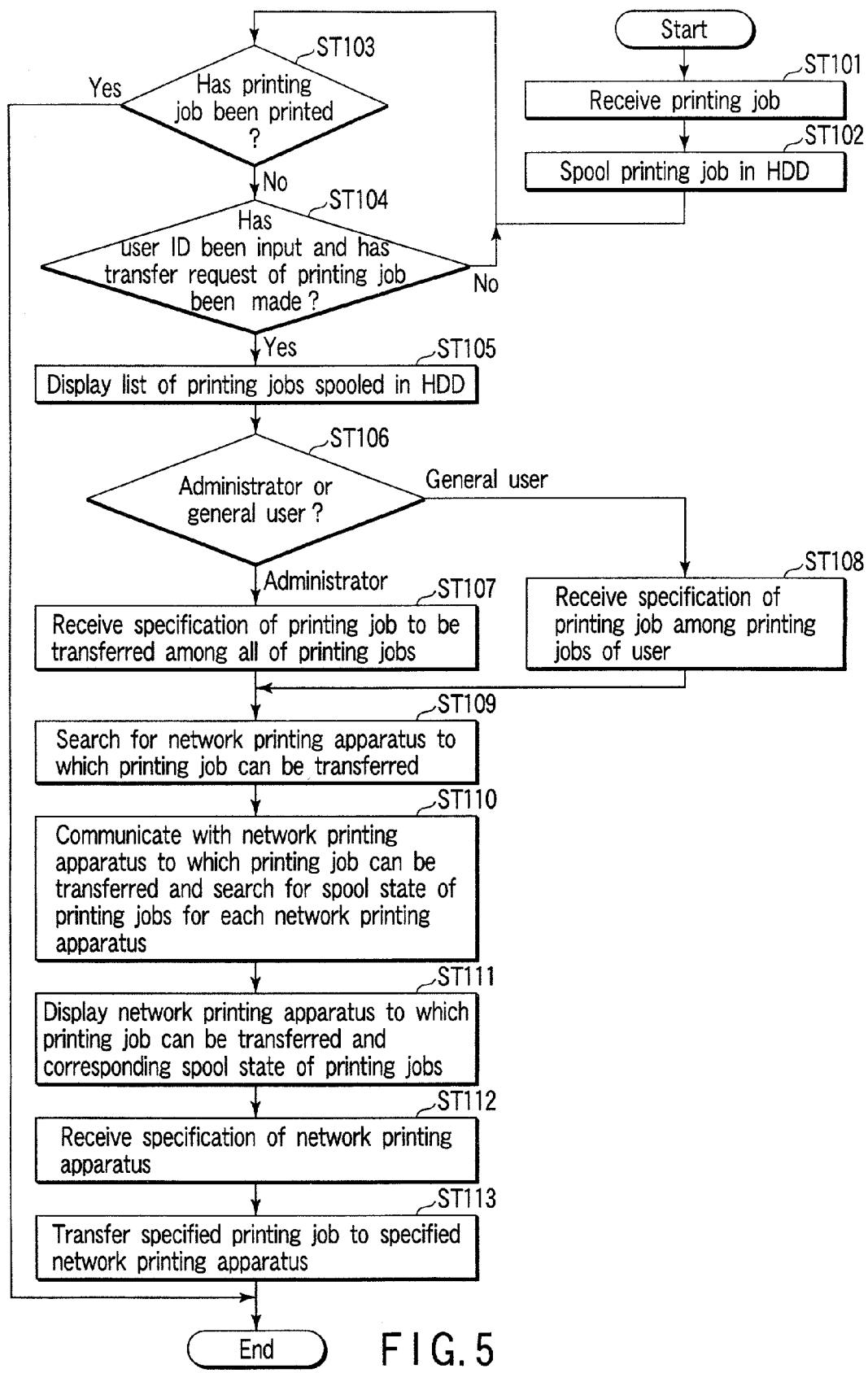
FIG. 5 is a diagram showing the flow of a process which a CPU in the first embodiment performs.

FIG. 5 is a diagram showing the flow of a process which the CPU 12 of the network printing apparatus performs.

A printing job is received in step ST101. The printing job is spooled in the spool section 181 in step ST102. Whether the printing job spooled in the spool section 181 has been printed or not is determined in step ST103. If it is determined in the above determination step that the printing job has been printed, the process is terminated. If it is determined that the printing job has not been printed, whether a transfer request of the printing job and inputting of a user ID from the operating section 6 are made or not is determined in step ST104. If it is determined that the transfer request of the printing job and inputting of the user ID have not been made, the process returns to step ST103. The process of steps ST103, ST104 is repeatedly performed until the printing operation of the printing job spooled in the spool section 181 is terminated.

If it is determined that the transfer request of the printing job and inputting of the user ID have been made, a list of the printing jobs spooled in the spool section 181 is displayed on the liquid crystal panel 7 in step ST105. Whether the input user ID indicates an administrator or a general user is determined in step ST106. If it is determined in the above determination step that the user ID indicates the administrator, the specification of a printing job to be transferred among all of the printing jobs is received in step ST107. If it is determined that the user ID indicates the general use, the specification of a printing job to be transferred among the printing jobs transmitted by the user who inputs the user ID is received in step ST108.

Next, network printing apparatuses to which the printing job can be transferred are searched for by use of a protocol such as SLP and SSDP in step ST109. Then, communication is made to each of the network printing apparatuses to which the printing job can be transferred by use of a protocol such as SLP and SSDP and the spool states of the printing jobs in the network printing apparatuses are searched for in step ST110. Lists of the network printing apparatuses to which the printing job can be transferred and the spool states of the network printing apparatuses are displayed on the liquid crystal panel 7 in step ST111.

After this, the specification of the network printing apparatus to which the printing job is transferred among the network printing apparatuses displayed is received in step ST112. The specified printing job is transferred to the specified network printing apparatus by use of a protocol such as LPR, IPP, RAW, IPC in step ST113 and the process is terminated.

In the above network 5, a user of the PC 4 registered as a general user operates the PC 4 to make a printing request to the network printing apparatus 2, for example. The network printing apparatus 2 temporarily spools a printing job in the spool section 181. The network printing apparatus 2 instantly performs the printing operation of the printing job if another printing job is not spooled, but the network printing apparatus 2 does not instantly perform the printing operation of the printing job if the network printing apparatus 2 is performing the printing operation of another printing job or if a plurality of printing jobs are spooled in the spool section 181.

That is, when the user goes to the network printing apparatus 2 to pick up printed matter after the user made a printing request, the printed matter requested by the user is not yet completed in some cases. At this time, the user inputs a user ID by use of a plurality of buttons 9, 10, 11 of the network printing apparatus 2. Then, the user inputs the printing job transferring button 8. If the above inputting operation is performed, the network printing apparatus 2 displays the printing jobs spooled in the spool section 181 on the liquid crystal panel 181. While observing the display, the user specifies the printing job which was requested to print by himself. Next, the network printing apparatus 2 displays the other network printing apparatuses 3, 4 to which the printing job can be transferred and the spool states of the printing jobs in the network printing apparatuses 3, 4. While observing the display, the user specifies the network printing apparatus 3 in which no printing job is spooled, for example.

When receiving the specification, the network printing apparatus 2 transfers the specified printing job to the network printing apparatus 3. Then, the network printing apparatus 3 to which the printing job is transferred instantly performs the printing operation.

According to the network printing apparatus of the first embodiment, the user can easily transfer his own printing job to another network printing apparatus when the requested printing operation is set in a wait state in the network printing apparatus which is requested to print by the user.

Further, since the printing job can be transferred to a desired one of the network printing apparatuses in the present place when the user goes to pick up printed paper in order to check whether the printing operation is completed or not, the operability of the printing job transfer process of the network printing apparatus can be enhanced.

Second Embodiment

Next, a second embodiment is explained. In this case, portions which are the same as those of the first embodiment are denoted by the same reference symbols and the detailed explanation thereof is omitted.

Figure 6:
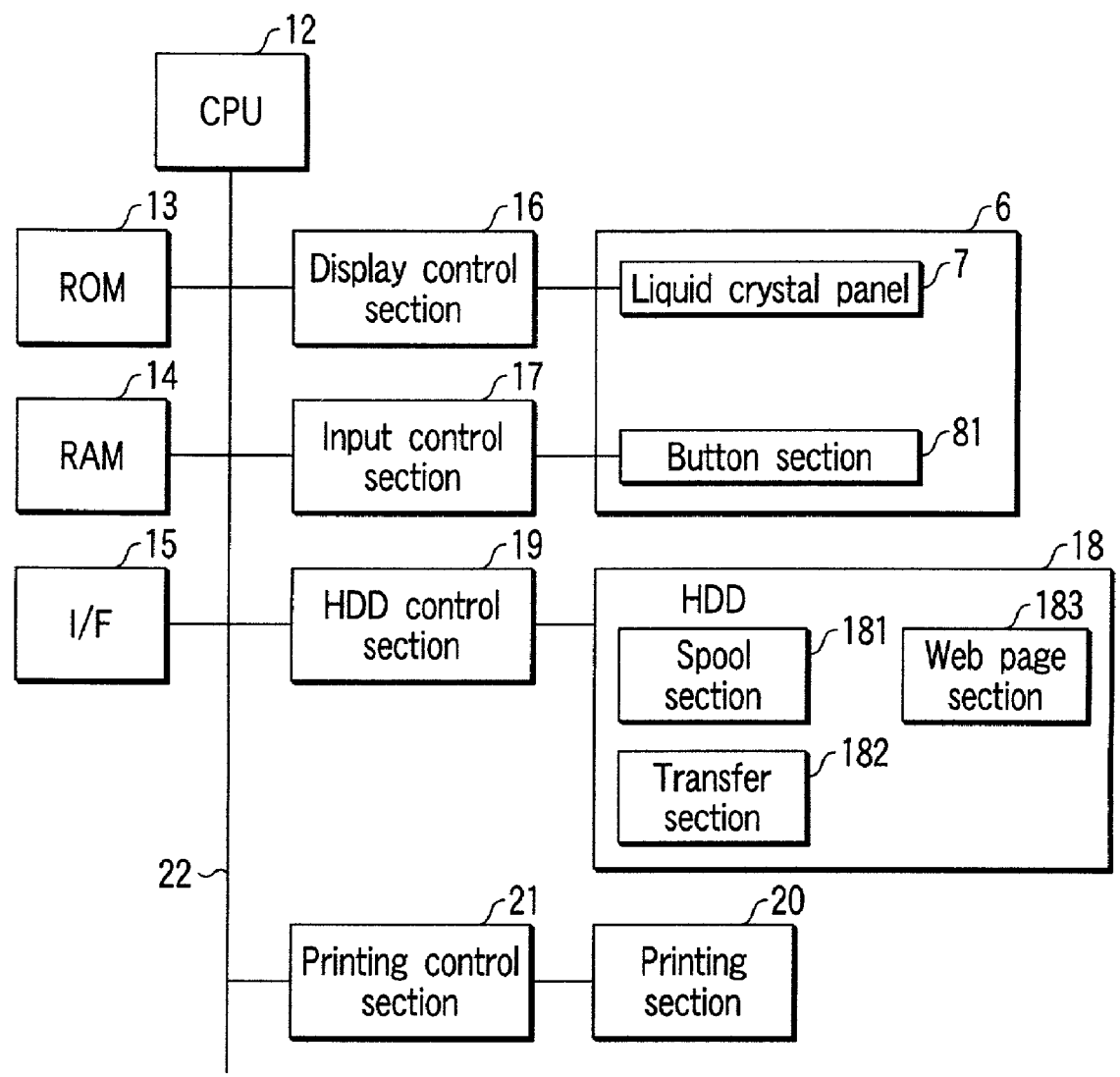
FIG. 6 is a diagram showing a general control block of a network printing apparatus in a second embodiment of this invention.

A network printing apparatus of the second embodiment is different from the network printing apparatus of the first embodiment in that an operating section 6 does not have function of permitting the user to transfer a printing job. Further, as shown in the control block diagram of the network printing apparatus of FIG. 6, a web page section 183 which provides information of printing jobs spooled in a spool section 181 and information of other network printing apparatuses connected to a network 5 on a web page is provided in an HDD 18. For example, access can be made to the web page from the browser of a PC 4 by use of HTTP (hyper text transfer protocol).

Figure 7:
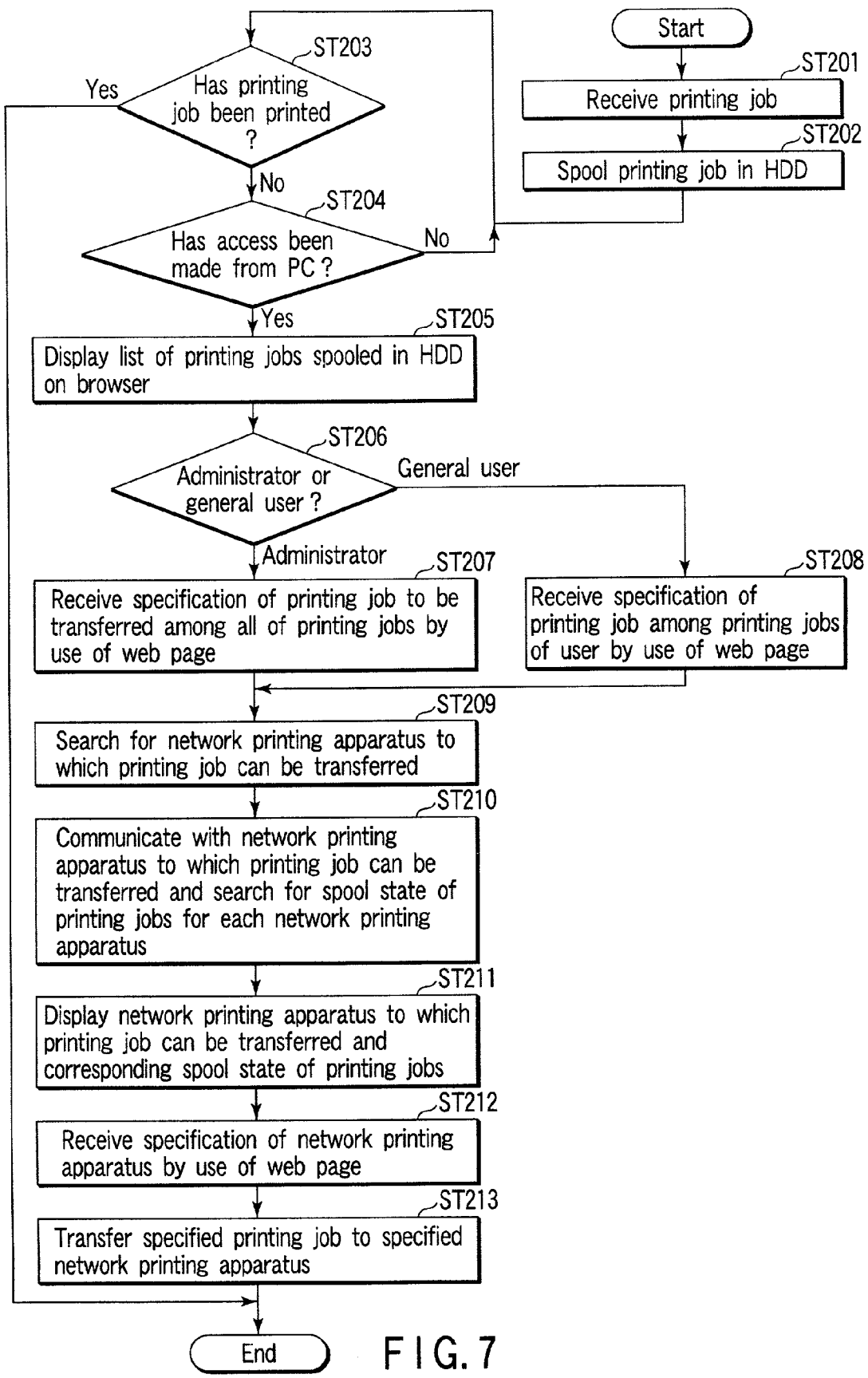
FIG. 7 is a diagram showing the flow of a process which a CPU in the second embodiment performs.

A process performed by a CPU 12 of the network printing apparatus with the above configuration is explained with reference to FIG. 7.

In step ST201, a printing job is received. The printing job is spooled in the spool section 181 in step ST202. Whether the printing job spooled in the spool section 181 has been printed or not is determined in step ST203. If it is determined in the above determination step that the printing job has been printed, the process is terminated. If it is determined that the printing job has not been printed, whether access to a web page provided by the web page section 183 from the PC 4 has been made or not is determined in step ST204. If it is determined that no access has been made, the process returns to step ST203. The above process is repeatedly performed until the printing operation of the printing job spooled in the spool section 181 is terminated.

If it is determined that access from the PC 4 has been made, a list of the printing jobs spooled in the spool section 181 is displayed on the web page in step ST205. Whether a user ID registered in the PC 4 which makes access indicates an administrator or a general user is determined in step ST206. If it is determined in the above determination step that the user ID indicates the administrator, the specification of a printing job to be transferred among all of the printing jobs is received in step ST207. If it is determined that the user ID indicates the general user, the specification of a printing job to be transferred among the printing jobs transmitted by the user is received in step ST208.

Next, network printing apparatuses to which the printing job can be transferred are searched for in step ST209. Then, communication is made to each of the network printing apparatuses to which the printing job can be transferred and the spool states of the printing jobs in the network printing apparatuses are searched for in step ST210. Lists of the network printing apparatuses to which the printing job can be transferred and the spool states of the network printing apparatuses are displayed on the web page in step ST211.

After this, the specification of the network printing apparatus to which the printing job is transferred and which is selected from the network printing apparatuses displayed on the web page is received in step ST112. The specified printing job is transferred to the specified network printing apparatus in step ST113 and the process is terminated.

In the above network 5, if the printing operation of the network printing apparatus to which the user makes a printing request is set in the waiting mode, the printing job of the user can be specified on the web page, the network printing apparatus of the transferring destination can be specified and thus the printing job can be transferred.

Like the network printing apparatus of the first embodiment, according to the second embodiment, if the printing operation of the network printing apparatus to which the user makes a printing request is set in the waiting mode, the user can easily transfer his own printing job to another network printing apparatus.

Further, since information of the printing jobs spooled and information of the other network printing apparatuses are displayed as the web page on the display 27 of the PC 4, a large amount of information can be displayed on one display screen and the user can easily observe the information.

Generally, since access software for the web page is incorporated in the PC, the above effect can be obtained simply by adding the function of providing the web page to the network printing apparatus.

Third Embodiment

Next, a third embodiment is explained. In this case, portions which are the same as those of the first embodiment are denoted by the same reference symbols and the detailed explanation thereof is omitted.

A network printing apparatus of the third embodiment is different from the network printing apparatus of the first embodiment in that an operating section 6 has no function of permitting the user to transfer a printing job.

Figure 8:
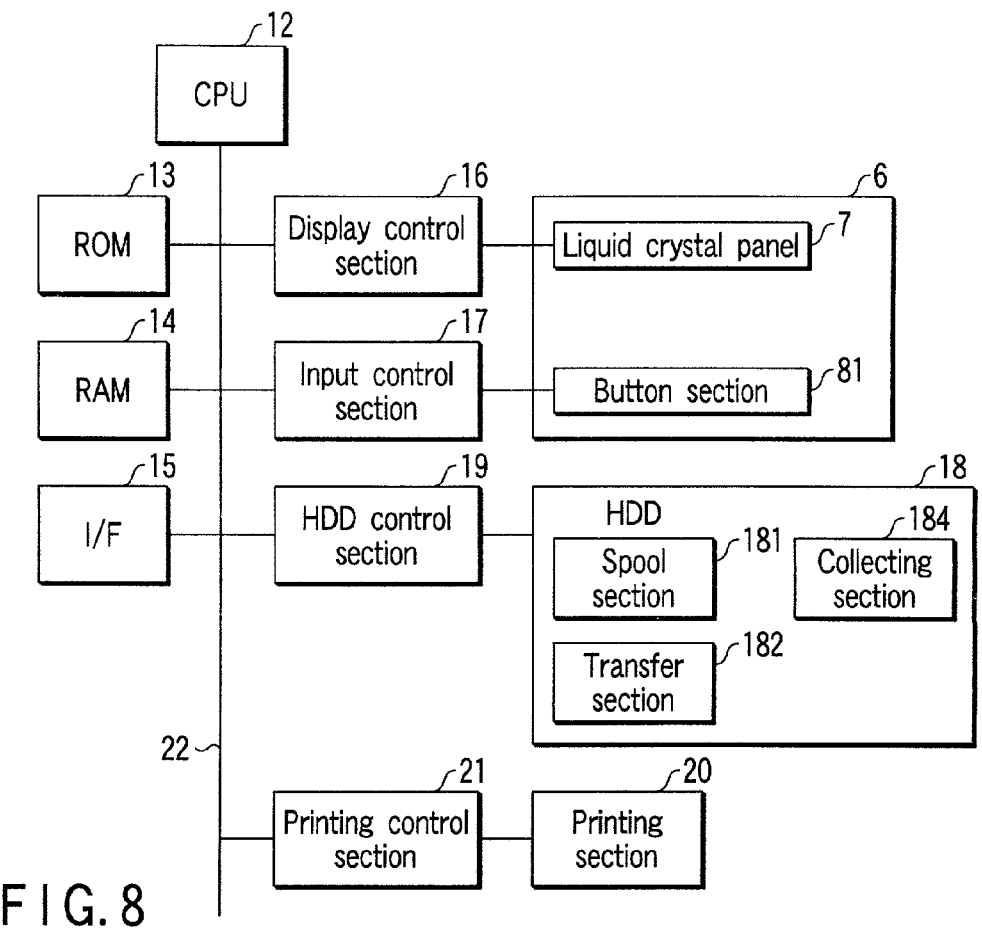
FIG. 8 is a diagram showing a general control block of a network printing apparatus in a third embodiment of this invention.

Further, as shown in the control block diagram of the network printing apparatus of FIG. 8, a collecting section 184 which collects information of spooled printing jobs and information of other network printing apparatuses when a prescribed instruction is received from an application is provided in an HDD 18.

Figure 9:
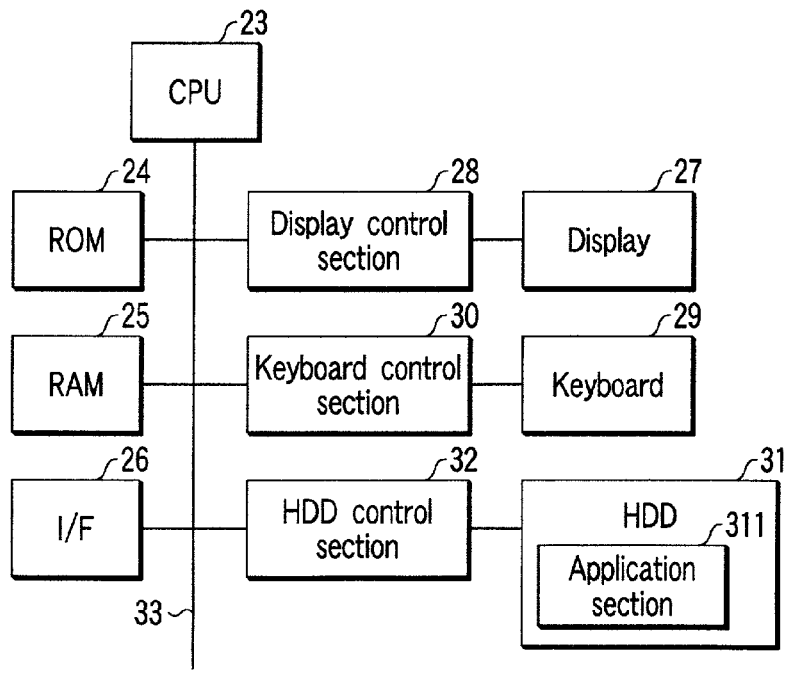
FIG. 9 is a diagram showing a control block of the PC in the third embodiment.

In addition, as shown in the control block diagram of the PC of FIG. 9, an application section 311 storing an application which permits the network printing apparatus to collect information of printing jobs spooled in the network printing apparatus to which the computer itself transmits the printing job and information of the other network printing apparatuses, receive the specification of the printing job and the specification of the network printing apparatus after acquiring the above information and transmit the received specifications as information to the network printing apparatus is provided in an HDD 31.

Figure 10:
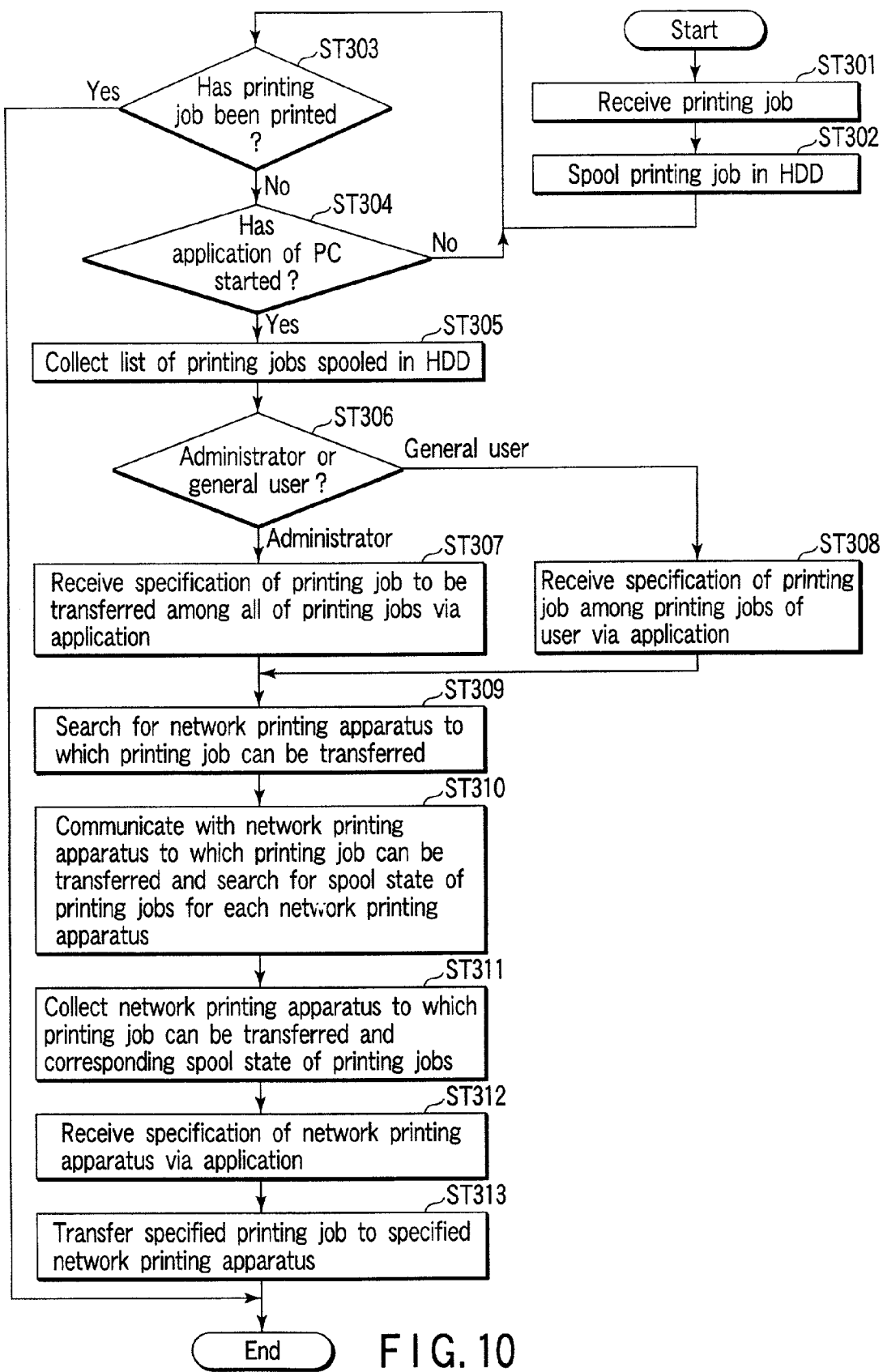
FIG. 10 is a diagram showing the flow of a process which a CPU in the third embodiment performs.

FIG. 10 is a diagram showing the flow of a process performed by a CPU 12 of the network printing apparatus.

In step ST301, a printing job is received. The printing job is spooled in the spool section 181 in step ST302. Whether the printing job spooled in the spool section 181 has been printed or not is determined in step ST303. If it is determined in the above determination step that the printing job has been printed, the process is terminated. If it is determined that the printing job has not been printed, whether the application stored in the application section 311 of the PC 4 has been started or not is determined in step ST304. If it is determined that the application has not been started, the process returns to step ST303. The above process is repeatedly performed until the printing operation of the printing job spooled in the spool section 181 is terminated.

If it is determined that the application has started, information of a list of the printing jobs spooled in the spool section 181 is collected in step ST305. Whether a user ID registered in the PC 4 which makes access indicates an administrator or a general user is determined in step ST306. If it is determined in the above determination step that the user ID indicates the administrator, the specification of a printing job to be transferred among all of the printing jobs is received according to the application of the PC in step ST307. If it is determined that the user ID indicates the general user, the specification of a printing job to be transferred among the printing jobs transmitted by the user is received according to the application of the PC in step ST308.

Next, network printing apparatuses to which the printing job can be transferred are searched for in step ST309. Then, communication is made to the network printing apparatuses to which the printing job can be transferred and the spool states of the printing jobs in the network printing apparatuses are searched for in step ST310. Lists of the network printing apparatuses to which the printing job can be transferred and the spool states of the network printing apparatuses are collected in step ST311.

After this, the specification of the network printing apparatus to which the printing job is transferred is received based on the application of the PC in step ST312. Then, the specified printing job is transferred to the specified network printing apparatus in step ST313 and the process is terminated.

Like the network printing apparatus of the first embodiment, according to the third embodiment, if the printing operation of the network printing apparatus to which the user makes a printing request is set in the waiting mode, the user can easily transfer his own printing job to another network printing apparatus.

Further, since information of the printing jobs spooled and information of the other network printing apparatuses are displayed on the display 27 according to the application stored in the application section 311 of the PC 4, a large amount of information can be displayed on one display screen and the user can easily observe the information.

In each of the above embodiments, the spool section 181 which spools the printing jobs is provided in the HDD 18 of the network printing apparatus, but if a network printing apparatus which does not have an HDD 18 is used, the spool section 181 may be provided in the RAM 14 and the transferring section 182 may be provided in the ROM 13, for example.

Further, a case wherein the network printing apparatus searches for the network printing apparatuses to which the printing job can be transferred after the printing job is specified if it transfers the printing job, then searches for the spool states of the printing jobs in the network printing apparatuses and receives the specification of one of the network printing apparatuses is explained. However, this invention is not limited to the above case and it is possible to receive the specification of the printing job and the specification of the network printing apparatus from the user after information of the printing jobs spooled and the network printing apparatuses to which the printing job can be transferred are searched for and the spool states of the printing jobs of the network printing apparatuses are searched for.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A printing apparatus using a network which is used in a network environment in which a plurality of computer devices and a plurality of network printing apparatuses are connected to the network, said printing apparatus comprising:
   a spool section which spools printing jobs received from the computer devices;
   a display section which displays information of the printing jobs and information of other network printing apparatuses in response to a preset operation;
   an operating section which is used to receive a specification of one of the printing jobs based on the information of the printing jobs and a specification of one of the network printing apparatuses based on the information of the other network printing apparatuses; and
   a transfer section which transfers the specified printing job to the specified network printing apparatus;
   wherein the information of the other network printing apparatuses includes a spool state of printing jobs of each of the other network printing apparatuses.

2. A printing apparatus using a network which is used in a network environment in which a plurality of computer devices and a plurality of network printing apparatuses are connected to the network, said printing apparatus comprising:
   a spool section which spools printing jobs received from the computer devices;
   a web page section which stores a web page via which the spooled printing jobs and information of other network printing apparatuses are provided to at least one of the computer devices, and through which a specification of one of the printing jobs and a specification of one of the network printing apparatuses are received; and
   a transfer section which transfers the specified printing job to the specified network printing apparatus;
   wherein the information of the other network printing apparatuses includes a spool state of printing jobs of each of the other network printing apparatuses.

3. A printing system using a network which is used in a network environment in which a plurality of computer devices and a plurality of network printing apparatuses are connected to the network, wherein at least one of the computer devices comprises:
   an application section which stores an application for collecting (i) information of printing jobs spooled in one of the network printing apparatuses to which the computer transmits a printing job and (ii) information of other network printing apparatuses, and for receiving a specification of one of the printing jobs and a specification of one of the network printing apparatuses based on the collected information, wherein the computer transmits the received specifications as information to the network printing apparatus;

wherein at least one of the network printing apparatuses comprises:
- a spool section which spools printing jobs received from the computer devices;
- a collecting section which collects the information of the spooled printing jobs and the information of the other network printing apparatuses when a prescribed instruction is received from the application of the computer; and
- a transfer section which tranfers the specified printing job to the specified network printing apparatus; and wherein the information of the other network printing apparatuses includes a spool state of printing jobs of each of the other network printing apparatuses.

4. A printing method using a network which is used in a network environment in which a plurality of computer devices and a plurality of network printing apparatuses are connected to the network, said method comprising:
- spooling, by one of the network printing apparatuses, printing jobs received from the computer devices;
- displaying information of the printing jobs;
- receiving, from an operating section, a specification of one of the printing jobs based on the information of the printing jobs;
- displaying information of other network printing apparatuses;
- receiving, from the operating section, a specification of one of the network printing apparatuses based on the information of the other network printing apparatuses; and
- transferring the specified printing job to the specified network printing apparatus;
- wherein the information of the other network printing apparatuses includes a spool state of printing jobs of each of the other network printing apparatuses.

5. A printing method using a network which is used in a network environment in which a plurality of computer devices and a plurality of network printing apparatuses are connected to the network, said method comprising:
- spooling, by one of the network printing apparatuses, printing jobs received from the computer devices;
- providing information of the spooled printing jobs via a web page;
- receiving a specification of one of the printing jobs via the web page;
- providing information of other network printing apparatuses via the web page;
- receiving a specification of one of the other network printing apparatuses; and
- transferring the specified printing job to the specified network printing apparatus;
- wherein the information of the other network printing apparatuses includes a spool state of printing jobs of each of the other network printing apparatuses.

6. A printing method using a network which is used in a network environment in which a plurality of computer devices and a plurality of network printing apparatuses are connected to the network, said method comprising:
- spooling, by one of the network printing apparatuses, printing jobs received from the computer devices;
- collecting information of the spooled printing jobs when a prescribed instruction is received from an application stored in at least one of the computer devices;
- receiving, via the application, a specification of one of printing jobs based on the collected information of the spooled printing jobs;
- collecting information of other network printing apparatuses when a prescribed instruction is received via the application;
- receiving, via the application, a specification of one of the network printing apparatuses based on the collected information of the other network printing apparatuses; and
- transferring the specified printing job to the specified network printing apparatus;
- wherein the information of the other network printing apparatuses includes a spool state of printing jobs of each of the other network printing apparatuses.

7. A printing apparatus using a network, which is used in a network environment in which a plurality of computer devices and a plurality of network printing apparatuses are connected to the network, said printing apparatus comprising:
- spool means for spooling printng jobs received form the computer devices;
- display means for displaying information of the printing jobs and information of other network printing apparatuses in response to a preset operation;
- operating means for receiving a specification of one of the printing jobs based on the information of the printing jobs and a specification of one of the network printing apparatuses based on the information of the other network printing apparatuses; and
- transfer means for transferring the specified printing job to the specified network printing apparatus;
- wherein the information of the other network printing apparatuses includes a spool state of printing jobs of each of the other network printing apparatuses.

8. A printing apparatus using a network, which is used in a network environment in which a plurality of computer devices and a plurality of network printing apparatuses are connected to the network, said printing apparatus comprising:
- spool means for spooling printing jobs received from the computer devices;
- web page storing means for storing a web page via which the spooled printing jobs and information of other network printing apparatuses are provided to at least one of the computer devices, and through which a specification of one of the printing jobs and a specification of one of the network printing apparatuses are received; and
- transfer means for transferring the specified printing job to the specified network printing apparatus;
- wherein the information of the other network printing apparatuses includes a spool state of printing jobs of each of the other network printing apparatuses.

9. A printing system using a network, which is used in a network environment in which a plurality of computer devices and a plurality of network printing apparatuses are connected to the network, wherein at least one of the computer devices comprises:
- application means for storing an application for collecting (i) information of printing jobs spooled in one of the network printing apparatuses to which the computer transmits a printing job and (ii) information of other network printing apparatuses, and for receiving a specification of one of the printing jobs and a specification of one of the network printing apparatuses based on the collected information, wherein the computer transmits the received specifications as information to the network printing apparatus;

wherein at least one of the network printing apparatuses comprises:

spool means for spooling printing jobs received from the computer devices;

collecting means for collecting the information of the spooled printing jobs and the information of the other network printing apparatuses when a prescribed instruction is received from the application of the computer; and transfer means for transferring the specified printing job to the specified network printing apparatus; and wherein the information of the other network printing apparatuses includes a spool state of printing jobs of each of the other network printing apparatuses.

* * * * *